United States Patent
Renzing

[15] 3,659,900
[45] May 2, 1972

[54] SCRAPER CONVEYOR GUIDING LONGWALL MACHINE

[72] Inventor: Otto Renzing, Bochum, Germany

[73] Assignee: Gebr. Eickhoff, Maschinenfabrik und Eisengiesserei mbH, Bochum, Germany

[22] Filed: Feb. 3, 1970

[21] Appl. No.: 8,283

[30] Foreign Application Priority Data

Feb. 4, 1969 Germany..................G 69 04 184

[52] U.S. Cl..................299/43, 198/171, 299/33
[51] Int. Cl..................................E21c 35/14
[58] Field of Search..................299/34, 43–46; 198/171

[56] References Cited

UNITED STATES PATENTS

3,339,981  9/1967  Dommann et al..................299/43 X

FOREIGN PATENTS OR APPLICATIONS

48,691  2/1938  France..................198/171
1,109,606  4/1968  Great Britain..................198/171

Primary Examiner—Ernest R. Purser
Attorney—Walter Becker

[57] ABSTRACT

A scraper conveyor in which the entraining means, such as buckets or scrapers, are connected to endless circulating pulling means and move in grooves or troughs for conveying the material while the conveying trough and the trough for guiding the return section of the conveyor are located adjacent to each other and symmetrically with regard to a partition between said troughs.

9 Claims, 3 Drawing Figures

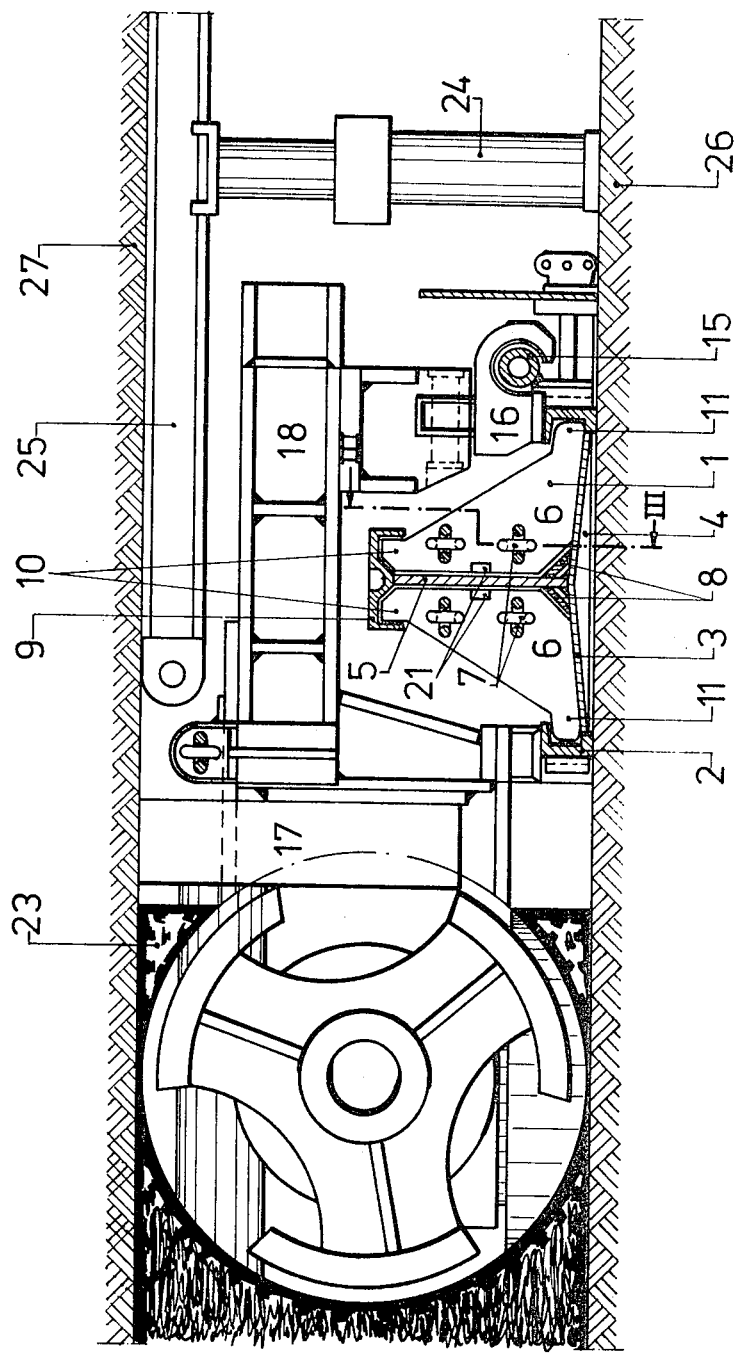

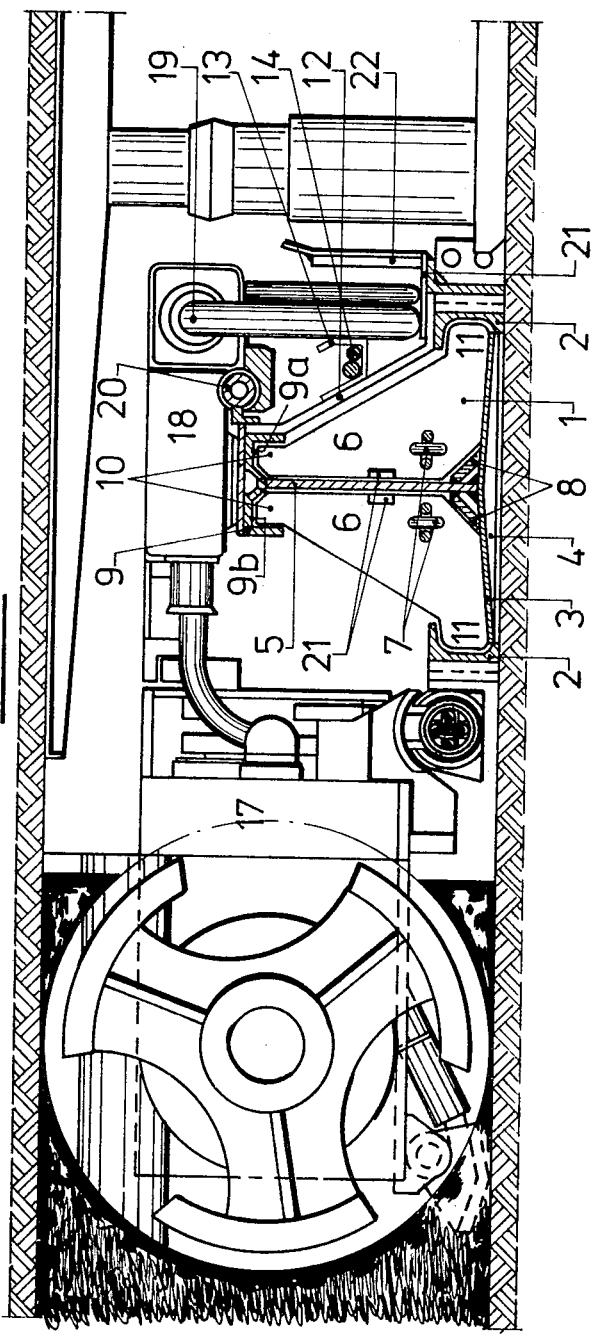
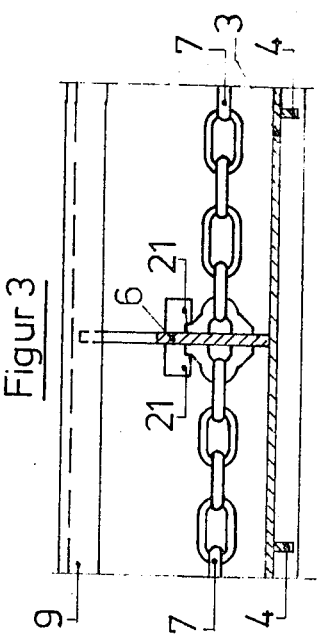

SCRAPER CONVEYOR GUIDING LONGWALL MACHINE

The present invention relates to a scraper conveyor with entraining means which are designed as sheet metal plates, buckets, or the like, and are connected to an endless circulating pulley means, for instance, chain or cable, in which at least the tight strand (in contrast to the slack strand) moves in a groove in the longitudinal direction of which the entraining means or followers move the material to the end of the groove or trough where it is loaded onto another transporting means. Such a scraper conveyor is employed, for instance, in connection with the mining of coal along a long wall. In such instances the conveyor extends generally over the entire long wall. The coal mined by a mining machine, such as a roller cutting loader, drilling cutting loader, planing machine, or the like, must be loaded into the trough of the conveying or tight section of the conveyor from where the coal is moved to one end of the long wall which in this instance leads into a loading section.

The height of the marginal area or edge of the groove or trough passed through by the tight section of the conveying means is of importance because also the coal located on the floor of the seam must during the loading operation be passed over the marginal area or edge. With a frequently employed design of scraper conveyors, the tight section is located at the top and moves along a base or bottom on which the material is conveyed, whereas below said base or bottom there moves the slack or return section of the conveyor. The edge of the conveyor groove or trough over which the material has to be passed during the loading operation is thus at least twice as high as the height of the scraper chain.

It is, therefore, an object of the present invention to provide a scraper conveyor in which the loading height for the material to be passed onto the conveying or tight section of the conveyor will be a minimum.

The link chain which is frequently employed as pulling means in scraper conveyors is, in view of the magnitude of the forces to be conveyed by the chain, subjected to considerable stresses and, therefore, breaks not unfrequently. In such an instance it is important quickly to locate the place where the break occurred in order to be able to repair the chain.

Therefore, it is a further object of this invention so to design the scraper conveyor that the pulling means can easily be checked and will easily be accessible.

It is still another object of this invention to provide the frame work of scraper conveyors with guiding means for the mining machine employed for mining the coal.

Therefore, it is desirable to equip the frame work of the scraper conveyor with means for conveniently mounting the conduits and conductors for supplying the driving energy to the mining machine, for feeding the illuminating devices, for mounting communication lines, such as telephones, conduits for supplying the water, and the like.

It is still another object of this invention so to design the scraper conveyor that it can easily adapt itself to the un-evenness of the ground or the flow of the seam and will have a stable construction.

It is a still further object of this invention to assure a safe guiding of the individual entraining means and to protect the same against buckling or slanting even when the load varies, which cannot be avoided, and when the material to be conveyed, for instance the coal, will pass onto the scraper conveyor in a non-uniform manner and stepwise as cannot be avoided with the usual mining machines in view of the non-homogeneous structure of the coal seam to be mined.

These and other objects and advantages of the invention will appear more clearly from the following specification in connection with the accompanying drawings, in which:

FIG. 1 illustrates a cross-section through a scraper conveyor according to the invention with a drilling coal cutter loader serving as mining machine, said section being taken at a right angle to the longitudinal direction of the long wall.

FIG. 2 is a cross-section slightly modified over that of FIG. 1.

FIG. 3 is a section through the central wall of the scraper conveyor, said section being taken along the line III-III of FIG. 1.

The scraper conveyor according to the present invention is characterized primarily in that the conveyor trough and the trough employed for guiding the return section of the conveyor are located adjacent to each other and substantially symmetrically with regard to a central partition wall separating said troughs. For purposes of guiding the entraining means or scrapers, there are employed inwardly arched outer marginal areas of the bottom of the trough. A further guiding of the entraining means or scrapers is effected by a head rail mounted on the central wall which head rail is provided with downwardly extending arched sections engaged by the entraining means. In order to prevent said entraining means from tilting, the entraining means are at both sides provided with protrusions which during the movement of the entraining means engage a flat surface of the said partition. As pulling means there are preferably employed round link chains. If desired, also two round link chains may be employed of which one is in engagement with the entraining means below said protrusions.

Referring now to the drawings in detail, the scraper conveyor 1 shown therein comprises an upwardly arched conveyor bottom 3 which is provided with transverse ribs 4 arranged in spaced relationship to each other. The bottom 3 has its outer marginal portion provided with inwardly extending lateral parts 2 which form guiding means for the scrapers or entraining means 6. The said scrapers or entraining means 6 have their upper extensions 10 extend into downwardly arched portions of U-shaped cross-section pertaining to a head rail 9. Between the foot portion of a partition 5 and the bottom 3 of the conveyor there are provided strips 8 of sheet metal material.

In FIG. 1 as well as in FIG. 2 the tight conveyor section is located on the left-hand side whereas the slack conveyor section is located on the right-hand side of the partition 5. As pulling means there is employed a round link chain 7. Whereas with the arrangement shown in FIG. 2 only one round link chain 7 is provided, the arrangement illustrated in FIG. 1 has two round link chains which are located above and below the protrusions or noses 21 respectively mounted on each of said entraining means 6. These protrusions will during the movement of the chain engage the partition 5 and be guided thereby. More specifically, the protrusions (see FIG. 3) will assure that the entraining means 6 occupy a position at a right angle with regard to the chain 7. The guiding of the individual entraining means is effected by the extensions 11 extending into the U-shaped lateral parts 2 and by the extensions 10 engaging the grooved portions 9a and 9b. The entraining means 6 have the shape of approximately a right-angled triangle in which the corner opposite the hypotenese is blunted. The other two corners form the guiding elevations.

FIGS. 1 and 2 also show a mining machine in the form of a so-called drilling cutter loader 17 working in the coal face. This mining machine itself, however, does not form a part of the invention. The drawing shows the cutter head of the mining machine. Usually, the machine body is located in the center and each of the two ends has associated therewith a cutter head of which one is employed when moving in one direction while the other is employed when moving in the other direction. Regardless of the type of the mining machine employed, it is important that the scraper conveyor will be able to serve for guiding such mining machine. With the design illustrated in FIG. 1, that side wall 2 of the conveyor which is located on the main filling side carries a guiding pipe 15. This guiding pipe 15 is engaged by a skid 16 of the mining machine 17. The skid 16 is pivotally connected to the gantry 18 of the mining machine 17. The gantry extends over the head rail 9 of the scraper conveyor. By means of said gantry 18, it is also possible to convey the so-called cutting cable, in other words, the cable which conveys the current for the drive of the mining machine.

According to the design illustrated in FIG. 2, flat irons 12 are provided which are located on the main filling side of the scraper conveyor in spaced relationship to each other between the part 2 and the head rail 9. The said flat irons 12 have their outside provided with supports 13 for receiving cables 14 for the telephone, for the lighting system, etc.

According to the design of FIG. 2, the side wall 2 is on the main filling side provided with a mounting 21 and stanchions 22. In this way chambers are created for supporting the cutter cable 19. According to the design of FIG. 2, the mining machine 17 guides itself on the head rail 9 and on the pipe 20 connected to the rail 9. The reference numeral 23 designates a coal seam while the reference numeral 24 designates a mine prop. There is furthermore provided a cap or dome 25. The floor of the seam is designated with the reference numeral 26, whereas the roof of the seam is designated with the reference numeral 27.

It is, of course, to be understood that the present invention is, by no means, limited to the particular construction shown in the drawings but also comprises any modifications within the scope of the appended claims.

What I claim is:

1. A scraper conveyor, which includes: endless pulling means having a tight section and a slack section, entraining means arranged in spaced relationship to each other in the longitudinal direction of said pulling means and connected to said pulling means, grooved guiding means guiding said entraining means, said guiding means including first groove means for guiding those entraining means which are connected to the respective tight section of said endless pulling means and also including second groove means for guiding those entraining means which are connected to the respective slack section of said endless pulling means, and partition means interposed between the entraining means connected to said tight and slack sections respectively, said tight and slack sections being substantially symmetrically arranged with regard to and on opposite sides of said partition means, head rail means mounted on the upper means of said partition means and provided with groove means facing downwardly and being located on opposite sides of said partition means for additionally guiding said entraining means.

2. A scraper conveyor according to claim 1, in which said grooved guiding means include base plate means having outer marginal portions of U-shaped cross-section open toward each other.

3. A scraper conveyor according to claim 1, in which said pulling means are formed by round link chain means.

4. A scraper conveyor according to claim 1, in which said bottom of said scraper conveyor is arched centrally upwardly from both sides and reinforced by transverse ribs therebelow.

5. A scraper conveyor according to claim 1, which includes flat iron means arranged between said head rail means and the outer marginal area of the slack section of said endless pulling means, and supporting means connected to said flat iron means for receiving conduit means.

6. A scraper conveyor according to claim 1, which includes guiding pipe means connected to said head rail means for engagement with jaw means of a mining machine to guide the latter.

7. A scraper conveyor according to claim 1, which includes stanchion means and supporting means arranged on the outside of said second groove means for receiving cables for conveying current to a mining machine.

8. A scraper conveyor according to claim 1, in which said entraining means are provided with protrusions respectively engaging opposite side wall surfaces of said partition means for holding said entraining means substantially vertically and in planes substantially perpendicular to the longitudinal extension of said pulling means.

9. A scraper conveyor according to claim 8, in which said pulling means include two round link chains respectively arranged above and below said protrusions and engaging said entraining means.

* * * * *